United States Patent [19]

Nakamura et al.

[11] Patent Number: 5,189,540
[45] Date of Patent: Feb. 23, 1993

[54] LIQUID CRYSTAL DISPLAY DEVICE HAVING A MATERIAL FOR DISTURBING THE ORIENTATION OF THE LIQUID CRYSTAL MOLECULES

[75] Inventors: Kimiaki Nakamura; Hidefumi Yoshida; Kazutaka Hanaoka, all of Kawasaki, Japan

[73] Assignee: Fujitsu Limited, Kawasaki, Japan

[21] Appl. No.: 829,883

[22] Filed: Feb. 3, 1992

[30] Foreign Application Priority Data

Feb. 1, 1991 [JP] Japan ................................. 3-11787
Mar. 25, 1991 [JP] Japan ................................. 3-60475
Mar. 27, 1991 [JP] Japan ................................. 3-62309

[51] Int. Cl.$^5$ .............................................. G02F 1/13
[52] U.S. Cl. ........................................ 359/102; 359/78; 359/93; 359/99
[58] Field of Search ................ 359/77, 78, 93, 99, 359/100, 101, 102, 52

[56] References Cited

U.S. PATENT DOCUMENTS

| | | | |
|---|---|---|---|
| 4,097,128 | 6/1978 | Matsumoto et al. | 359/93 |
| 4,277,144 | 7/1981 | Saurer et al. | 359/77 |
| 4,775,226 | 10/1988 | Montgomery, Jr. et al. | 359/52 |
| 5,093,735 | 3/1992 | Doane et al. | 359/52 |
| 5,136,403 | 8/1992 | Jones et al. | 359/52 |

FOREIGN PATENT DOCUMENTS 0313053 4/1989 European Pat. Off. .
0076028 3/1989 Japan ................................. 359/82
3-134622 6/1991 Japan .

OTHER PUBLICATIONS

D. Meyerhofer, "Optical transmission of liquid-crystal field-effect cells," Journal of Applied Physics, vol. 48, No. 3, Mar. 1977, New York, NY, pp. 1179–1185.
Patent Abstracts of Japan, vol. 7, No. 256 (P-236) Nov. 15, 1983 & JP-A-58 139124 (Toshiba) Aug. 18, 1983.
Patent Abstracts of Japan, vol. 9, No. 243 (P-392) Sep. 30, 1985 & JP-A-60 095423 (Citizen) May 28, 1985.
Patent Abstracts of Japan, vol. 15, No. 352 (P-1248) Sep. 6, 1991 & JP-A-03 134622 (Seiko) Jun. 7, 1991.

Primary Examiner—William L. Sikes
Assistant Examiner—Huy K. Mai
Attorney, Agent, or Firm—Staas & Halsey

[57] ABSTRACT

A liquid crystal display device is equipped with a liquid crystal cell formed by disposing a pair of transparent substrates each having a drive electrode and an alignment layer formed and laminated thereon so as to oppose each other with a small space therebetween, and charging and sealing a liquid crystal into the space, wherein the liquid crystal molecules are oriented under a twist state along the vertical axis of the substrate surface, and the orientation of the liquid crystal molecules inside a plane, which is parallel to the substrate surface and is spaced apart by an arbitrary distance from the substrate, are irregular inside this plane. According to this structure, uniform display characteristics can be obtained even when the viewing angle direction is different.

16 Claims, 18 Drawing Sheets

UV RAY IRRADIATION

Fig. 24(A) (PRIOR ART)
Fig. 24(B) (PRIOR ART)
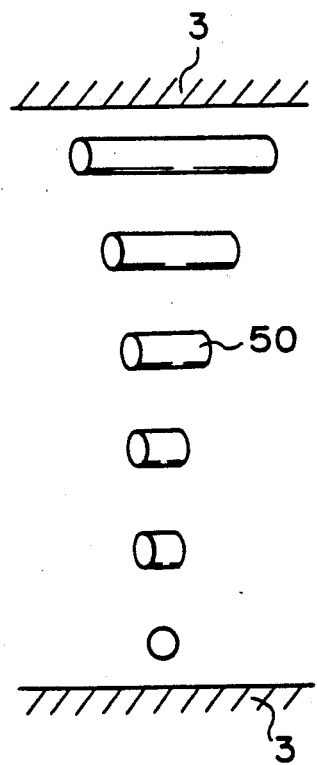
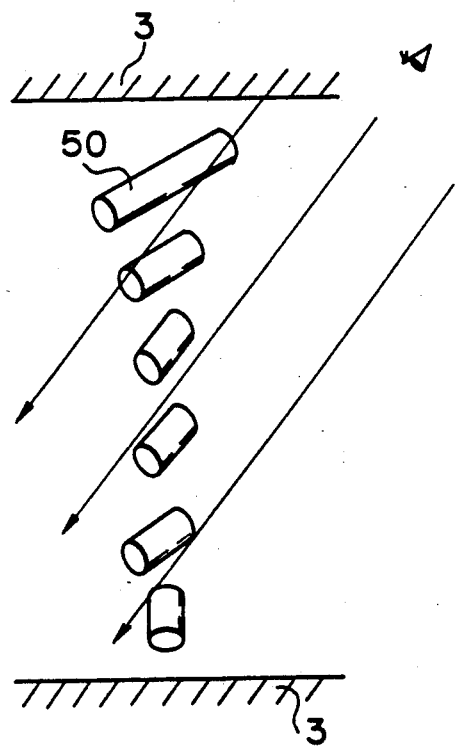

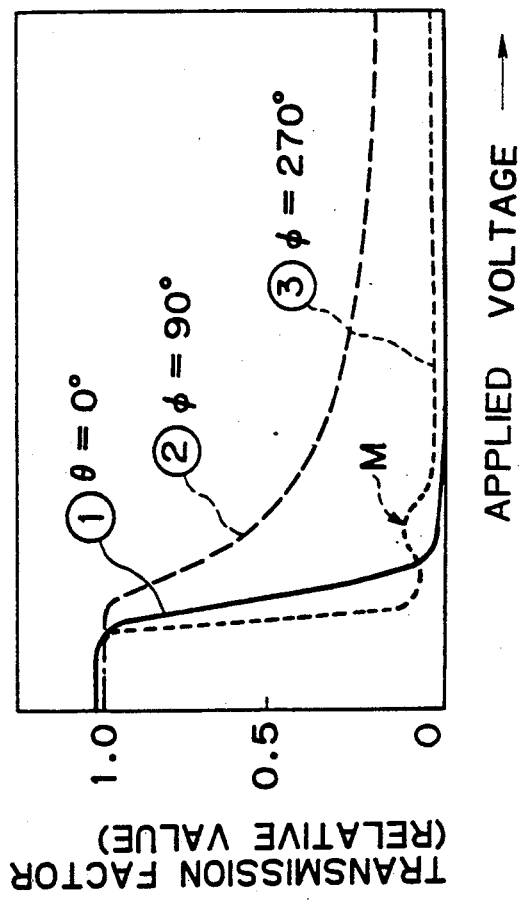

LIQUID CRYSTAL DISPLAY DEVICE HAVING A MATERIAL FOR DISTURBING THE ORIENTATION OF THE LIQUID CRYSTAL MOLECULES

BACKGROUND OF THE INVENTION

1. Field of the Invention

This invention generally relates to a liquid crystal display device, and more particularly, to a liquid crystal display device having improved observation angle characteristics.

2. Description of the Related Art

Remarkable improvements have been made in liquid crystal display devices, and the liquid crystal display devices themselves have gained wider general applications. Nevertheless, demands for a higher accuracy of the liquid crystal display devices and for a greater display screen sizes have increased, as have demands for an improvement in the display quality, and improvements in the observation angle performance, for example, are also required.

Conventional liquid crystal display devices in general have the structure shown in FIG. 23 of the accompanying drawings, which is an exploded perspective view showing a structural example of a typical conventional liquid crystal display device, which is a simple matrix type liquid crystal display device.

In the drawing, reference numeral 10 denotes a liquid crystal cell. This cell is produced by, for example, disposing two laminate structures of a stripe-like drive electrode consisting of an ITO ($In_2O_3$- $SnO_2$) film, for example, and an alignment layer consisting of a polyimide resin film, between transparent substrates 1,1 consisting of a glass plate, for example, and charging and sealing a liquid crystal 5 into the space defined therebetween. The direction of a dashed-line arrow in the drawing indicates the direction of orientation treatment of the alignment layer on each substrate, e.g., the rubbing direction. The rubbing directions are usually set so as to orthogonally cross each other, in the case of a TN type liquid crystal display panel. Reference numerals 7a and 7b denote polarization plates, respectively, that are disposed on both sides of the liquid crystal cell 10 in such a manner that the directions of the optical axes thereof orthogonally cross in the direction indicated by the solid line arrow in the drawing. Note, in the drawing, symbol $\phi$ represents a rotating angle of the observation angle, with a line X—X as the reference, and $\theta$ represents an elevation of the observation angle from line Z—Z. These are shown in order to indicate the directions of the observation angles.

Generally, the liquid crystal display device is operated in the following way. Rays of light are irradiated from the lower part of the drawing, and the light is converted to linearly polarized light by the polarizer 7b and made incident on the liquid crystal cell 10. When an electric field is not applied to the drive electrodes disposed so as to orthogonally cross each other, the polarization plane of the linearly polarized light is rotated by 90° and the light passes through the upper analyzer 7a; i.e., the display at this time is ON (bright). When the electric field is applied to a desired point of intersection of the drive electrodes, the orientation of the liquid crystal molecules at that portion changes, so that the transmitted light passes through the liquid crystal cell 10 without rotating the polarization plane and is blocked by the upper analyzer 7a; i.e., the display at this time is OFF (dark).

Accordingly, a bright and dark image display is effected by controlling the ON-OFF of the voltage applied for each pixel, by a drive control circuit not shown in the drawing.

FIG. 24 is a schematic view showing the orientation state of the liquid crystal molecules in a conventional liquid crystal display device, and shows the case of a liquid crystal cell which exhibits a "homegeneous orientation", such as a TN type, an STN type, etc. Reference numeral 3 in the drawing denotes an alignment layer, and 50 denotes the liquid crystal molecules.

FIG. 24 (A) shows an example where the electric field is not applied, and FIG. 24(B) shows the case where the electric field is applied. When the electric field is not applied, a twist of the liquid crystal molecules by 90°, for example, occurs between the upper and lower substrates, due to the orientation limiting force of the alignment layer 3. When the electric field is applied, it can be seen that the liquid crystal molecules rise perpendicularly to the substrate surface. Therefore, the ON-OFF control of the liquid crystal display device is effected as described above.

FIG. 25 shows transmission factor-v-applied voltage characteristics in a conventional liquid crystal display device. The transmission factor is plotted on the ordinate and the applied voltage on the abscissa. In the diagram, the solid line ① represents the case where $\theta=0$, i.e., where the liquid crystal display panel is viewed from immediately above, the dashed line ② represents the case where $\phi=90°$, i.e., where the liquid crystal display panel is observed from the deep side, and the dotted line ③ represents the case where $\phi=270°$, i.e., where the panel is observed from the front side.

Even when the electric field to be applied is uniformly increased, as in the example given above, the transmission factor, and thus the contrast, differ remarkably depending on the direction of the observation angle, and further, a maximum value M (inversion of displayed image) will occur in some cases.

Such an inversion of the displayed image occurs because the orientation direction of the liquid crystal molecules 50 appears different depending on the direction from which it is observed, as shown in FIG. 24(B), and thus the polarization state of the transmitted light does not change in the same way.

The inversion of the display leads to a serious problem in the display performance of the liquid crystal display devices, particularly liquid crystal display devices of a large screen size and high performance, is lowered, and thus a solution to this problem must be found.

SUMMARY OF THE INVENTION

The object of the present invention is to solve the problems of the prior art. Therefore, to accomplish this object, in a liquid crystal display device produced by disposing a pair of transparent electrodes each having a drive electrode and an alignment layer laminated thereon, so as to face each other with a small space therebetween, and charging and sealing a liquid crystal into this space, the liquid crystal display device in accordance with the present invention employs a structure wherein the liquid crystal molecules are arranged in a twisted state along the vertical axis of the substrate planes, and the arrangement of the liquid crystal molecules of the inside plane of the liquid crystal layers, which are in parallel with the substrate planes and are spaced by an arbitrary distance from the substrates, is irregular inside this plane.

The term "arbitrary distance" from the substrates in the liquid crystal display device of the present invention means the distance from any point between the substrate interface with the liquid crystal display panel and the center of the substrate.

BRIEF DESCRIPTION OF THE DRAWINGS

The above object and other advantages of the present invention will become more apparent from the following description of preferred embodiments of the invention, with reference to the accompanying drawings wherein;

FIG. 3 is a schematic view explaining the principle of the second embodiment of the present invention, wherein

FIG. 24 shows the orientation state of the liquid crystal molecules in a prior art example, wherein FIG. 24(A) shows the state where an electric field is not applied, and FIG. 24(B) shows the state where the electric field is applied; and FIG. 25 is a diagram showing transmission factor-v-applied voltage characteristics in a prior art example.

DESCRIPTION OF THE PREFERRED EMBODIMENTS

Hereinafter, preferred embodiments of the present invention will be described in detail.

In a liquid crystal display device of the type wherein a pair of transparent electrodes each having a drive electrode and an alignment layer laminated thereon are disposed so as to oppose each other with a small space therebetween, and a liquid crystal is charged and sealed into the space, the first preferred embodiment of the liquid crystal display device of the present invention has a structure in which a material for disturbing the twist of the liquid crystal molecules such as a polymer material is added to the liquid crystal layer to thereby form a network-like substance.

Since the network-like substance is formed inside the liquid crystal layer as described above, it becomes possible to disturb the arrangement of the liquid crystal molecules inside a plane parallel to the substrate surfaces and to make it irregular, as will be described below.

The network-like substance may be formed in a discontinuous form with small gaps therebetween inside the liquid crystal layer, or may be formed as a plurality of small masses dispersed inside the liquid crystal layer. More specifically, the network-like substance is preferably formed by an organic polymer, particularly by a photo-polymerisable polymer.

Specific examples of the organic polymers that can be used are polymethyl methacrylate, polystyrene melamine resins, urea resins, phenol resins, and polydiisopropyl fumarate, etc.

Specific examples of the photo-polymerisable polymers include polyurethane acrylate, polyester acrylate, epoxy acrylate, and polyether acrylate, etc.

The liquid crystal used in this embodiment of the invention is a cholesteric liquid crystal or a chiral-nematic liquid crystal.

Figure 1:
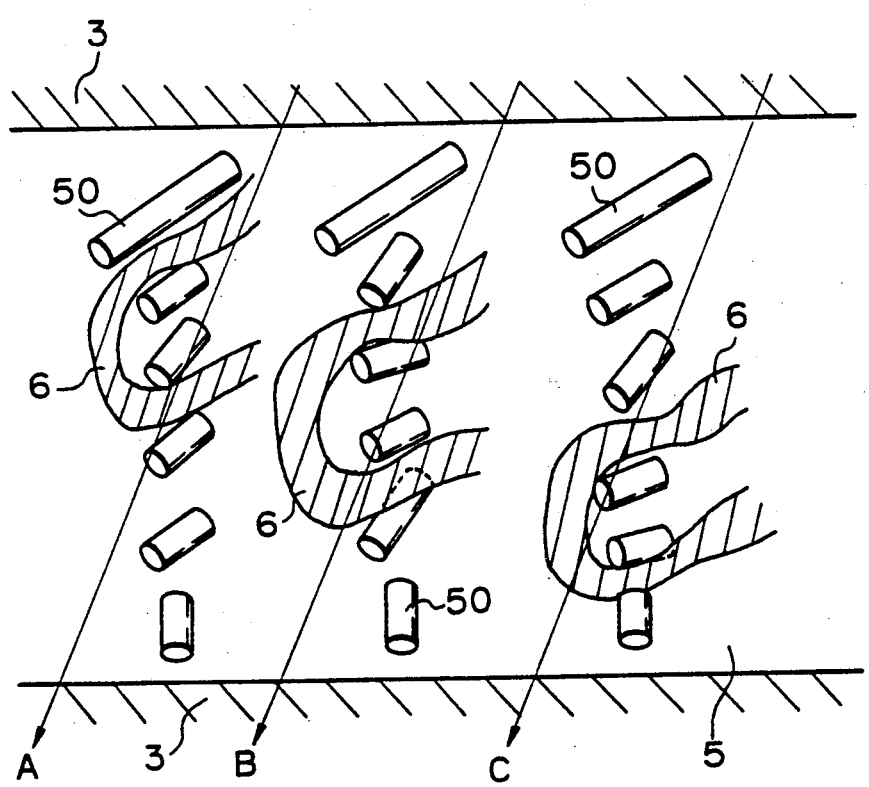
FIG. 1 is a schematic view explaining the principle of an embodiment of the present invention.
Figure 2:
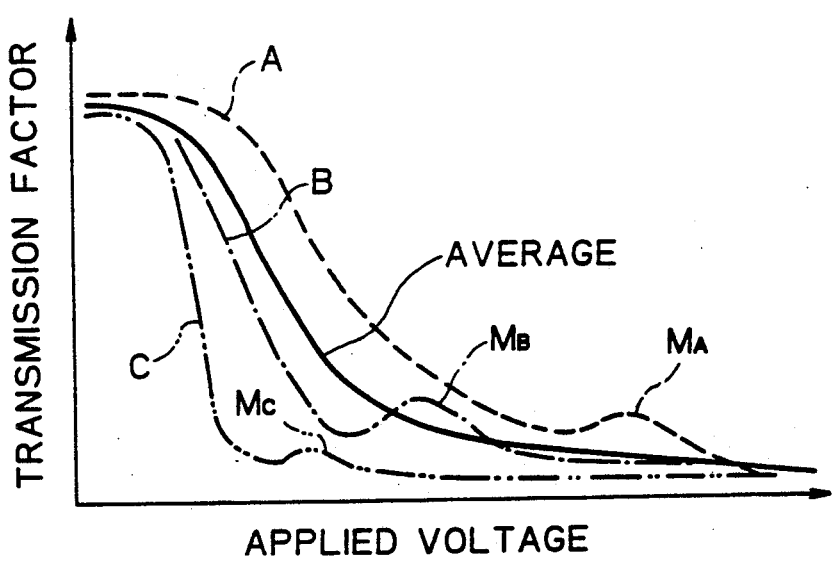
FIG. 2 is a diagram showing transmission factor-v-applied voltage characteristics in the first embodiment of the present invention.

FIGS. 1 and 2 explain the principle of the present invention described above. FIG. 1 is an enlarged, schematic sectional view of the liquid crystal layer wherein the orientation of the liquid crystal molecules 50 is shown as dispersed by the material for disturbing the arrangement of the liquid crystal molecules such as the network-like substance 6. It can be seen that the direction of orientation of the liquid crystal molecules 50 is impeded and changes very slightly even at the same viewing angle direction, depending on the positions inside the liquid crystal layers, i.e., on the lines A, B and C. In the drawing, reference numeral 3 denotes an alignment layer. FIG. 2 shows the transmission factor-v-applied voltage characteristics thereof. When observed microscopically, respective small maximum values, e.g., $M_A$, $M_B$, $M_C$, occur on the lines A, B and C in accordance with mutually different applied voltages, but an inversion of the display is inhibited as a mean value in the viewing angle direction, as indicated by a thick solid line.

Namely, in accordance with the present invention, the orientation direction of the liquid crystal molecules 50 can be sufficiently dispersed throughout the liquid crystal layer 5 as a whole by the network-like substance 6 formed in the liquid crystal layer 5 of the liquid crystal cell having an alignment layer which is so oriented by rubbing that the liquid crystals can be twisted. Namely, since the orientation of the liquid crystal molecules is averaged in the viewing angle direction, the maximum values also can be averaged in the apparent transmission factor-v-applied voltage characteristics. Accordingly, an abnormal inversion of the display can be eliminated and the display performance can be improved.

Figure 22:
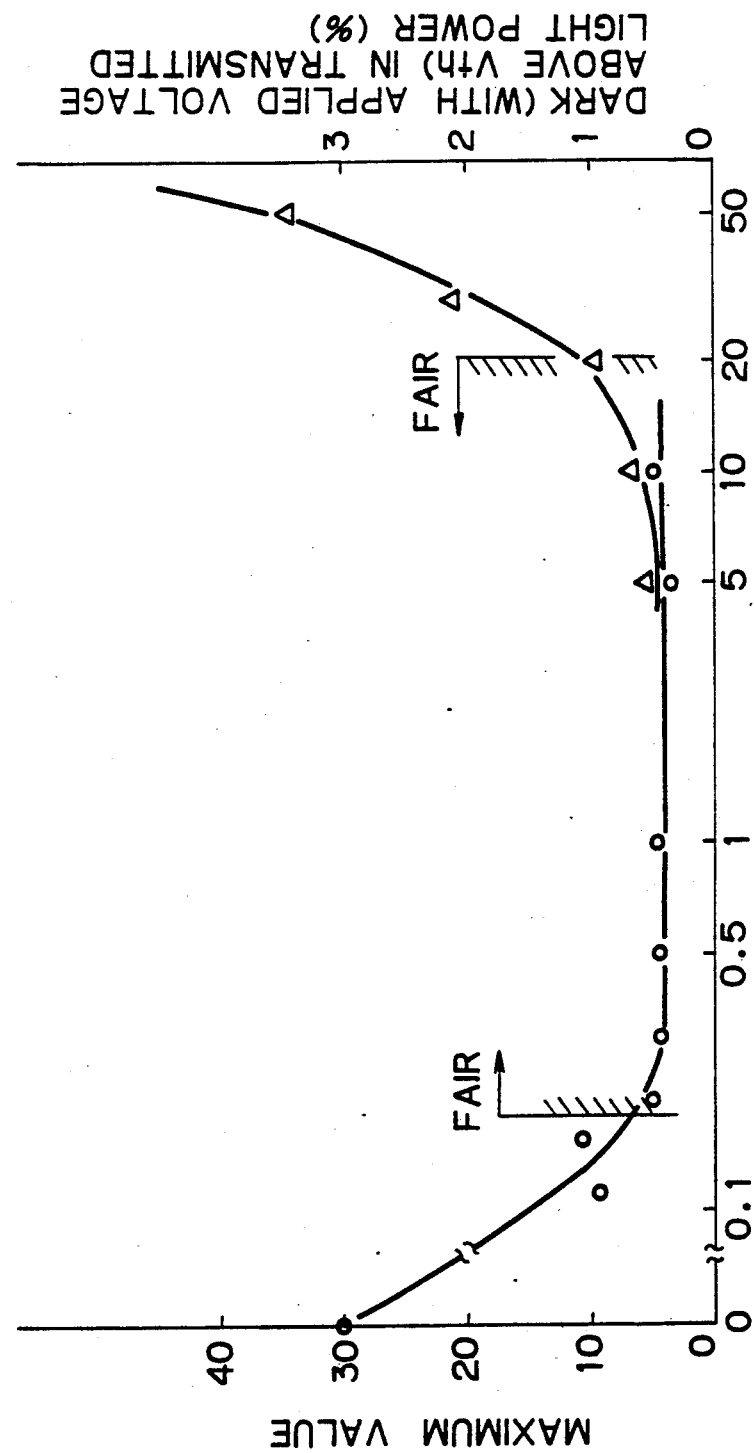
FIG. 22 is a diagram showing the relationship between a polymer amount and the maximum value of transmission factor-v-applied voltage characteristics in the present invention.
Figure 23:
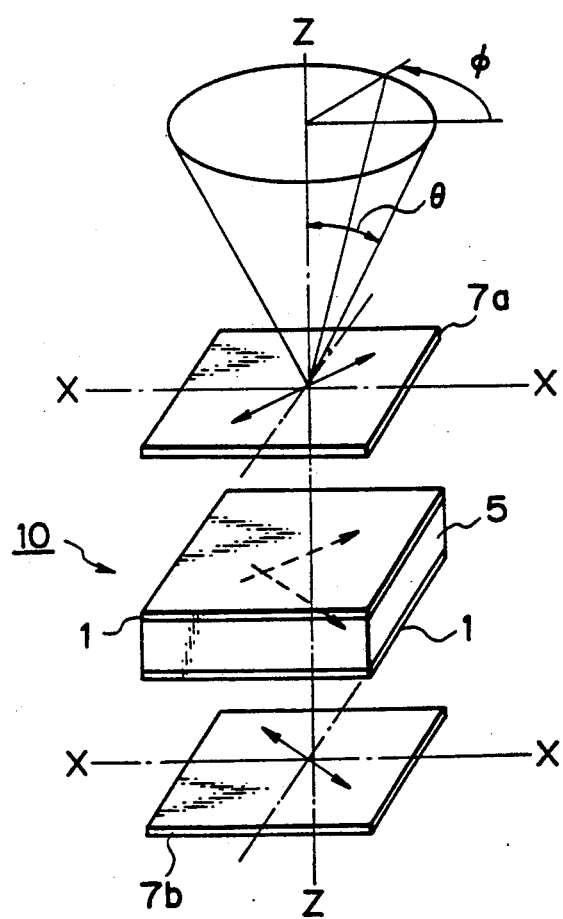
FIG. 23 is an exploded perspective view showing a structural example of conventional liquid crystal display panels.

The material for disturbing the twist of the arrangement of the liquid crystal molecules, e.g., the amount added of the polymer, will now be explained. FIG. 22 shows the relationship between the polymer amount and the maximum value of the transmission factor-v-applied voltage characteristics. As can be seen clearly from FIG. 22, the maximum value reaches a smallest value at the polymer amount of 0.2 wt % or more, and a good dark condition (black) can be obtained at the polymer amount of up to 20 wt %. Accordingly, the polymer amount in the liquid crystal layer must be within the range of 0.2 to 20 wt %.

Furthermore, in accordance with the second preferred embodiment of the present invention, the refractive index ($n_{ep}$, $n_{op}$) of the material for disturbing the twist of the arrangement of the liquid crystal molecules such as the network-like substance described above is set to the same level as the refractive index ($n_{ec}$, $n_{oc}$) of the liquid crystal (more precisely, by setting the difference of the refractive indices thereof to be within ±0.1) so that the molecular orientation of the network-like substance corresponds to the molecular orientation of the liquid crystal. Such a molecular orientation of the network-like substance can be imparted in accordance with the existence and absence of the voltage to be applied between the drive electrodes 2 of the liquid crystal display device during the fabrication thereof.

The network-like substance is made of an organic polymer, particularly preferably, of the photopolymerisable polymer, in the same way as in the first embodiment.

applied between the driving electrodes. Therefore, not only when the refractive index ($n_{ep}$, $n_{op}$) of the network-like substance 5 is different from the refractive index ($n_{ec}$, $n_{oc}$) of the liquid crystal 5 but also even when their refractive indices are equal, a matching of the refractive indices cannot be established at the boundary surface thereof. Therefore, the light Io propagating in the liquid crystal 5, for example, cannot be completely transmitted through the boundary surface with the network-like substance 6d but is separated into reflected light Ir and transmitted light It.

Figure 3A:
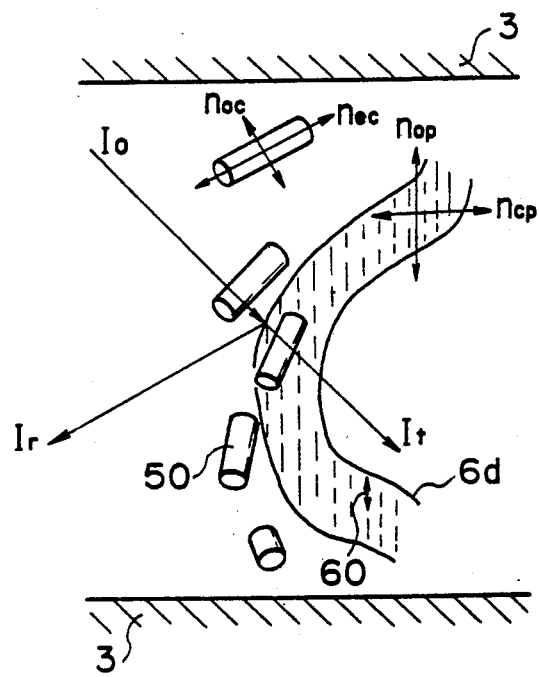
FIG. 3(A) shows the state where a voltage is not applied.
Figure 3B:
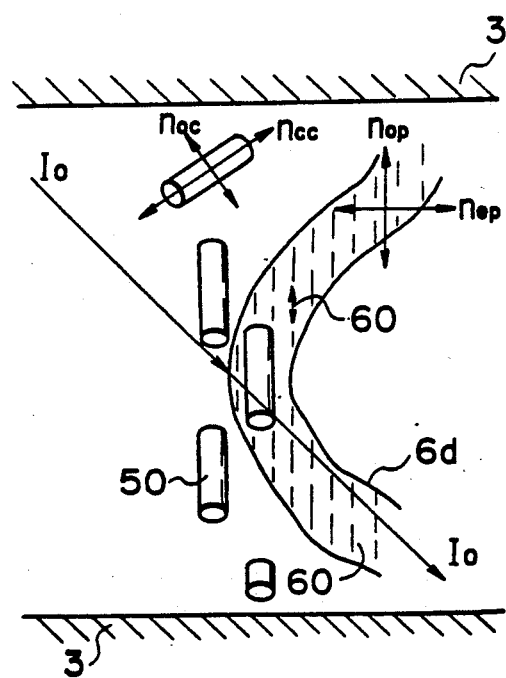
FIG. 3(B) shows the state where the voltage is applied.

When the voltage is applied, however, since the molecules 50 of the liquid crystal 5 are arranged perpendicularly to the surface of the alignment layer 3 inside the liquid crystal layer, as shown in FIG. 3(B), a matching of the refractive indices between the network-like substance 6d and the liquid crystal 5 is properly established on the boundary surface thereof, and no reflection of light occurs if the refractive index ($n_{ep}$, $n_{op}$) of the network-like substance 6d is equal to the refractive index ($n_{ec}$, $n_{oc}$) of the liquid crystal 5, or if the refractive indices thereof are at the same level (with the difference therebetween being within ±0.1). Therefore, the light Io travelling inside the liquid crystal 5 is completely transmitted through the boundary surface with the network-like substance 6d, and is transmitted through the liquid crustal cell as the transmitted light Io.

Namely, when the network-like substance 6d having such a structure is formed inside the liquid crystal 5, a reflection and scattering of the light on the boundary surface thereof can be prevented, and the quantity of light or light power during the OFF display (dark display) by the application of the voltage when the liquid crystal cell 10 is sandwiched between the polarization plates 7a, 7b disposed so as to cross each other, can be minimized, and accordingly, a liquid crystal display device having a high contrast can be obtained.

Definite examples of the second embodiment include polyurethane acrylate as the photo-polymerisable polymer (NOA65, n=1.524, a product of Norland Company) and a nematic liquid crystal (MJ-62877, n=1.4858, a product of Merc Company; a chiral agent is added to form a TN liquid crystal). Another combination example is 1,4-phenylene bis[4-[6-(acryloyloxy)-hexyloxy]benzoate] (Makromol. Chem. 190, 2255-2268(1989))

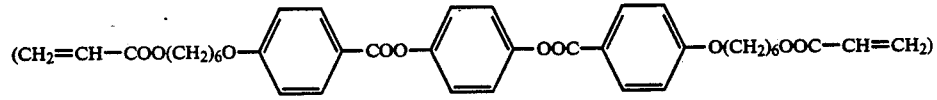

Next, the second embodiment will be described with reference to FIG. 3.

FIG. 3(A) is a schematic view showing the state where the voltage is not applied, and FIG. 3(B) shows the state where the voltage is applied.

In the drawings, reference numeral 6d denotes the network-like substance, and reference numeral 60 denotes the molecules of the network-like substance 6d. Arrows indicate the orientation direction of the major axis of the molecules.

Assuming that the orientation of the molecules 60 of the network-like substance 6d is perpendicular to the surface of the alignment layer 3, i.e., to the substrate surfaces, the molecules 50 of the liquid crystal 5 are arranged while being twisted inside the liquid crystal layer, as depicted in FIG. 3(A), when the voltage is not as a liquid crystal UV-curable resin and a nematic liquid crystal E7 (Merck Company, $n_o$=1.522; a chiral agent is added to form a TN liquid crystal).

Next, the third preferred embodiment of the present invention will be explained. In the liquid crystal display device of the third embodiment, a pair of transparent substrates each having a drive electrode formed thereon are arranged so to oppose each other with a small space therebetween, and a chiral nematic liquid crystal is charged and sealed into this space to form a liquid crystal cell. This liquid crystal display device is characterized by including at least the liquid crystal cell in which the orientation of the liquid crystal molecules at the starting point of the twist of the liquid crystal is randomized, and polarization plates are disposed on both sides of the liquid crystal cell so that the directions of the optical axes thereof cross each other.

Hereinafter, this third embodiment will be explained with reference to FIGS. 4 and 5.

Figure 4:
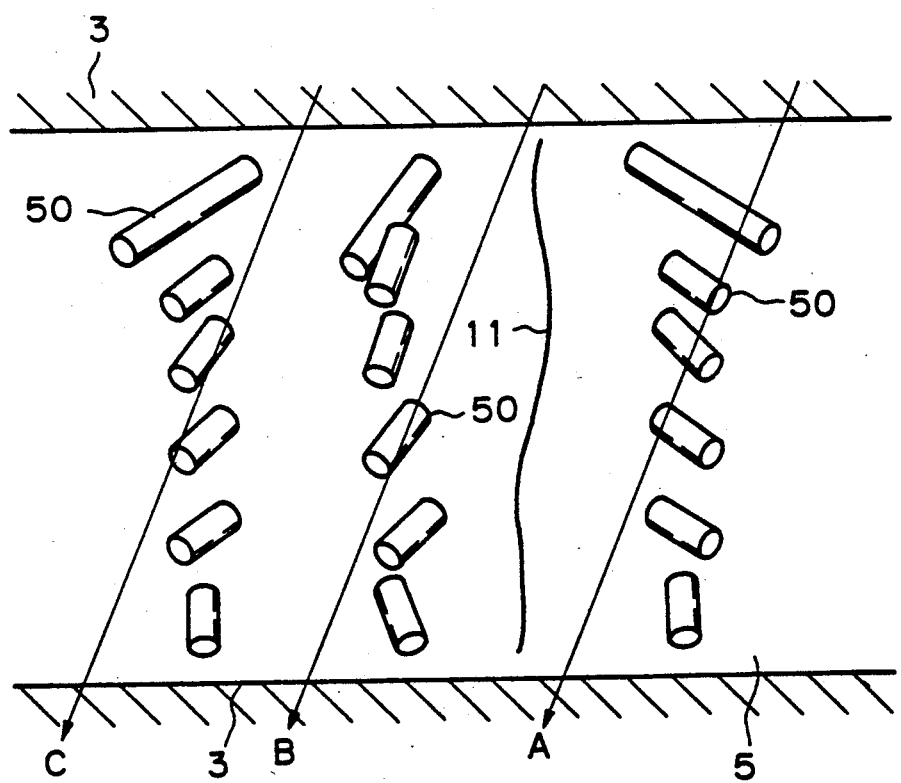
FIG. 4 is a schematic view explaining the principle of the third embodiment of the present invention.

FIG. 4 is a schematic sectional view explaining the principle of the third embodiment of the present invention. The drawing is an enlarged schematic view of the section of the liquid crystal layer, and the orientation of the liquid crystal molecules 50 is at random in the liquid crystal having a starting point of the twist that is randomized, such as a chiral nematic liquid crystal.

It can be seen that the directions of orientation of the liquid crystal molecules 50 become different (the dispersion of the orientation directions) depending on the positions inside the liquid layer, i.e. at the positions A, B and C, even from the same viewing angle direction.

Figure 5:
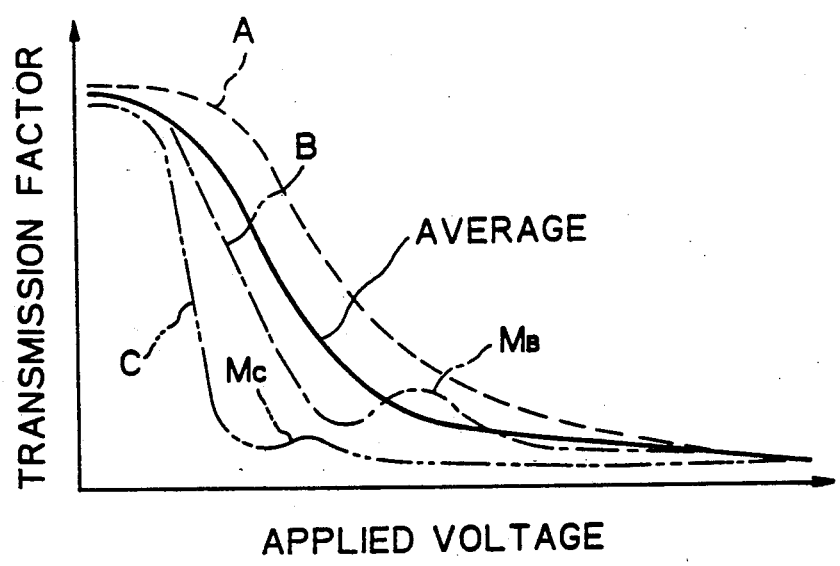
FIG. 5 is a diagram showing transmission factor-v-applied voltage characteristics in the third embodiment.

FIG. 5 shows the transmission factor-v-applied voltage characteristics of FIG. 4. When microscopically examined, respective small maximum values such as $M_B$ and $M_C$, occur on the lines B and C in the same direction at different impressed voltages, but the inversion of the display as the mean value in the viewing angle direction is inhibited, as indicated by a thick solid line.

According to the third embodiment described above, the starting point of the twist of the liquid crystal 5 of the liquid crystal cell 10 is randomized, and the orientation directions of the liquid crystal molecules 50 are sufficiently dispersed throughout the liquid crystal layer 5 as a whole. The starting point of the twist can be randomized by not effecting the rubbing treatment of the alignment layer.

Since the orientation of the liquid crystal molecules 50 can be made average in the viewing angle direction as described above, the maximum values on the apparent transmission factor-v-applied voltage characteristics can be averaged, the abnormal inversion of the display can be eliminated, and the display performance can be improved.

Furthermore, in a liquid crystal display panel using a chiral nematic liquid crystal, for example, a domain wall 11 (a wall surface on which the orientation of the liquid crystal becomes discontinuous) see FIG. 4) occurs in the liquid crystal layer 5. Since the condition of this domain wall 11 differs depending on the voltage previously applied, a hysteresis occurs in the transmission factor-v-applied voltage characteristics and results in an image sticking.

Nevertheless, when any of the network-like substance, small masses or protrusions or combinations of a plurality thereof are formed inside the liquid crystal layer 5, the domain wall 11 occurring in the liquid crystal 5 is broken, and thus the time required until a stabilization of the domain wall 11 can be shortened.

Since the domain wall 11 disappears when the electric field is applied, the memory characteristics of the liquid crystal due to the existence and absence of the domain wall 11 can be suppressed, and the hysteresis on the transmission factor-v-applied voltage characteristics can be eliminated.

When any of the network-like substance, small masses or protrusions or combinations of a plurality thereof are formed in the liquid crystal layer 5, the cycle of change of the starting point of the twist of the liquid crystal 5 becomes smaller, and a non-uniformity of the display resulting from the change of the starting point of the twist becomes negligible.

Hereinafter, the present invention will be explained in further detail with reference to Examples thereof, which are merely illustrative and in no way limit the present invention.

EXAMPLE 1

Figure 6:
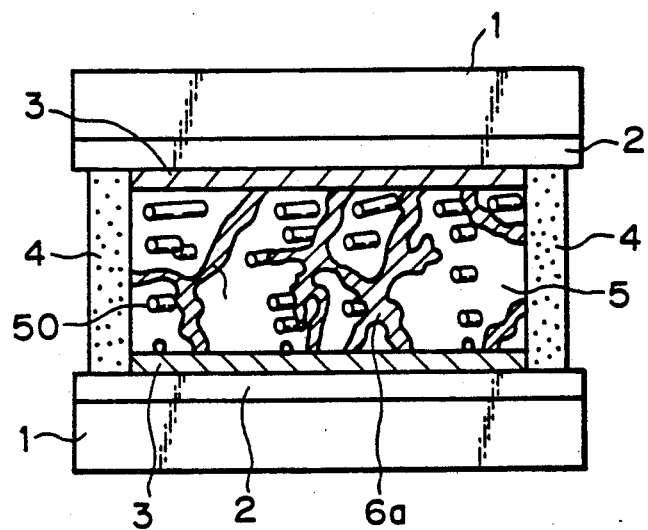
FIG. 6 is a schematic view showing an example of the first embodiment.

Example 1 explains the first preferred embodiment of the present invention, and FIG. 6 is a schematic sectional view showing an example of this embodiment.

In the drawing, reference numeral 4 denotes a seal layer, which is an adhesive layer incorporating therein a spacer for hermetically defining a liquid crystal charging space, and reference numeral 6a denotes a network-like substance.

Two glass substrates each having a size of 350×400 mm, for example, were used as the substrate 1. After a drive electrode 2 and an alignment layer 3 were formed on each thereof, both substrates were sealed by the seal layer while sandwiching a spacer, not shown, therebetween. The alignment layer was first subjected to a rubbing treatment in a predetermined direction.

As a liquid crystal 5 to be charged into the space defined between the substrates, this example used 99.5 wt % of a TN type liquid crystal (a nematic liquid crystal MJ-62877, a product of Merc Company) and 0.5 wt % of a chiral agent chloresteric nanoate, and the blending was made so as to form the network-like substrate 6a in the liquid crystal 5.

For example, 3 wt % of an acrylic type UV-curable prepolymer (HX-620, a product of Dai-Nippon Ink Co.) and 3 wt %, based on the UV-curable prepolymer, of a photo-polymerisation initiator were added to the TN type liquid crystal described above, and were well mixed so that they became homegeneous at a temperature of 90° C. or above.

While this mixture was kept at the high temperature, it was charged and sealed into the space of the liquid crystal cell 10. Next, while the liquid crystal cell was kept at 90° C., UV rays were irradiated until the polymerisation of the UV-curable prepolymer was completed. In this case, it was more effective to extend the UV irradiation time by reducing the intensity of the UV rays, in order to form the network.

Accordingly, the network-like substances 6a were formed in a suitable density inside the liquid crystal layer 5, as depicted in FIG. 6. Note, the acrylic type UV-curable polymer of this embodiment had a high transparency and had little affect on the overall brightness.

Figure 7:
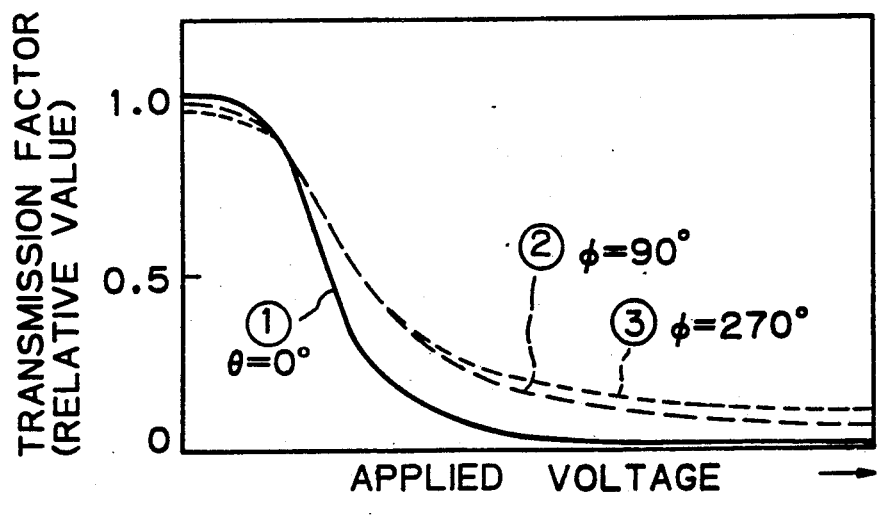
FIG. 7 is a diagram showing transmission factor-v-applied voltage characteristics of an example of the first embodiment.

FIG. 7 is transmission factor-v-applied voltage characteristic curve of the embodiment described above. The transmission factor is plotted on the ordinate and the applied voltage on the abscissa. In the diagram, a solid line ① represents the case where $\theta=0°$, i.e., when the liquid crystal panel was viewed from immediately above, the dash line ② represents the case where $\phi=90°$, i.e., when the liquid crystal panel was viewed from the deep side, and the dotted line ③ represents the case where $\phi=270°$, i.e., when the panel was viewed from the front side.

As can be understood from FIG. 7, no maximum value at all appears on any of the curves, although the contrast differs to some extent. Accordingly, since an inversion of the display did not occur, the display performance was greatly improved.

Figure 8:
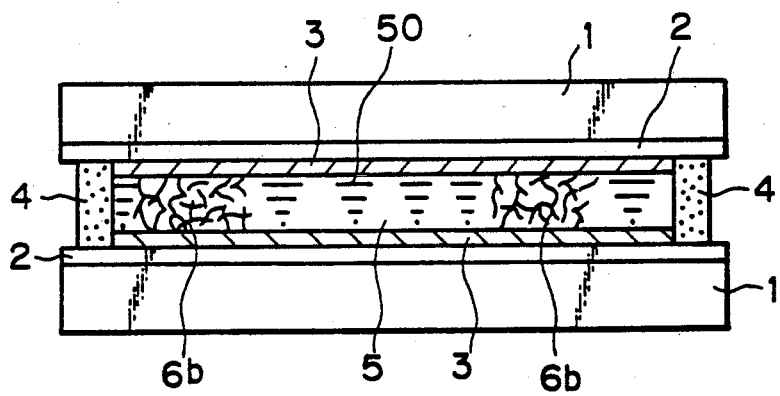
FIG. 8 is a sectional view showing another example of the first embodiment.

FIG. 8 is a schematic sectional view showing another example of the first embodiment of the invention. In the drawing, reference numeral 6b denotes the network-like substance. The characterizing feature of this example was that the network-like substances 6b were formed discontinuously inside the liquid crystal layer 5 with small gaps therebetween. In this case, the network-like substances 6b could be formed by intermittently effecting UV irradiation at irregular intervals, in contrast to the full surface UV irradiation in the example described above, or by first discontinuously coating the polymerisation initiator with small gaps, then charging the liquid crystal 5 containing the UV-curable prepolymer into the liquid crystal 5, and thereafter, irradiating the UV rays. This example had the advantage that the influence on the brightness of the liquid crystal display device could be further reduced by increasing the average transmission factor.

In this case, furthermore, if the liquid crystal region, in which the network-like substances are not formed, is formed to become linear, the shape of the domain wall (the wall surface on which the orientation of the liquid crystal is discontinuous) also becomes linear, which is stable with respect to time, whereby the response time can be improved.

Figure 9:
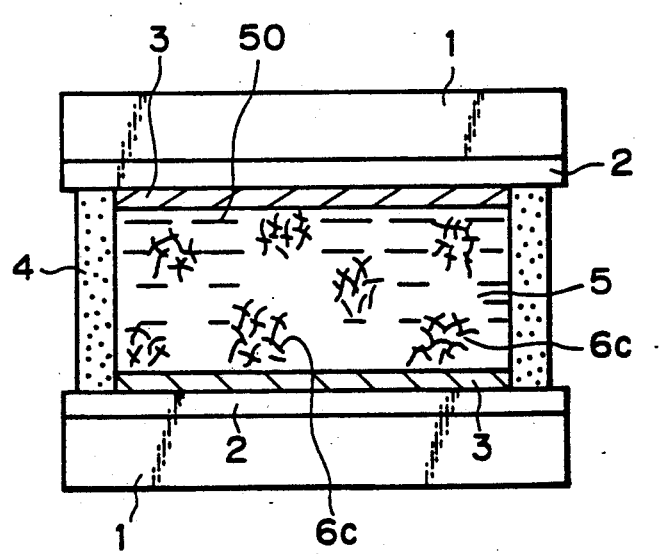
FIG. 9 is a sectional view showing still another example of the first embodiment.

FIG. 9 shows still another example of the first embodiment. This example is characterized in that the network-like substance 6c was formed as a plurality of small masses dispersed in the liquid crystal layer 5. These small masses could be formed by dispersing the polymerisation initiator in the form of fine particles not soluble in the liquid crystal 5 and then carrying out the polymerisation, for example. In the same way as the example described above, this example provided the advantages that a bright screen could be obtained and the production became easier in some cases.

Although the examples given above all deal with, and explain, the simple matrix type liquid crystal display panel, the present invention also can be applied to an active matrix type liquid crystal display panel and to other liquid crystal display panels, for example, wherein the major proportion of the liquid crystal molecules in the liquid crystal layer are in a uniform orientation state such as a homogeneous or homeotropic state, due to the restriction force of the boundary surface without an application of the electric field, but shift to another uniformly oriented state due to the interaction between the electric field and the polarization of the liquid crystal molecules when the electric field is applied.

The materials of the network-like substance 6 and other constituent materials of the panel are not limited, in particular, to those described above, unless departing from the gist of the present invention, and the present invention also may be accomplished by other materials, production processes or by the combinations thereof.

According to the first embodiment of the present invention as described above, the network-like substance formed in the liquid crystal layer of the liquid crystal cell can sufficiently disperse the orientation direction of the liquid crystal molecules throughout the liquid crystal layer 5 as a whole. Namely, since the orientation of the liquid crystal molecules can be averaged with respect to the viewing angle direction, the maximum values on the apparent transmission factor-v-applied voltage characteristics are averaged and an inversion of the abnormal display is eliminated, whereby the performance and quality of the liquid crystal display device can be dramatically improved.

EXAMPLE 2

This example represents the embodiment (the second embodiment described above) wherein the material for disturbing the twist of the orientation of the liquid crystal molecules is set to the same level as the refractive index of the liquid crystal, so that the molecular orientation of this material corresponds to the molecular orientation of the liquid crystal.

FIG. 10 shows an example of the method of producing the second embodiment, and illustrates the main steps of a definite method of producing the display device explained with reference to FIG. 3.

Figure 10A:
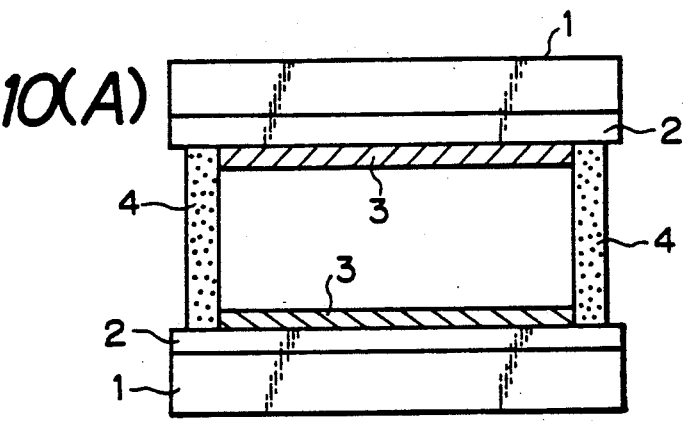
FIG. 10(A-C) is a sectional view showing an example of the product method of the second embodiment.
Figure 10B:
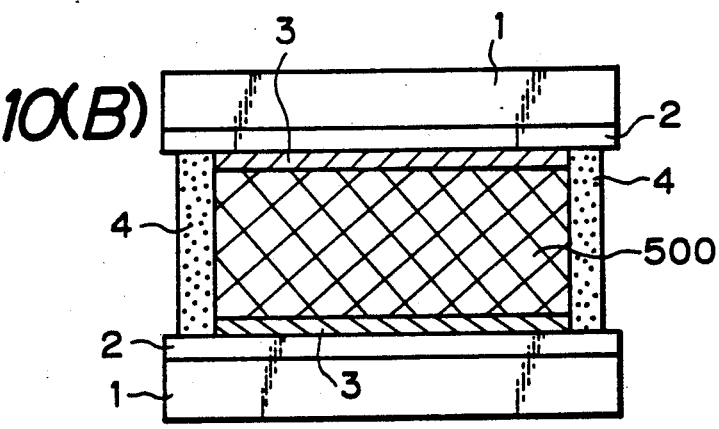
Figure 10C:
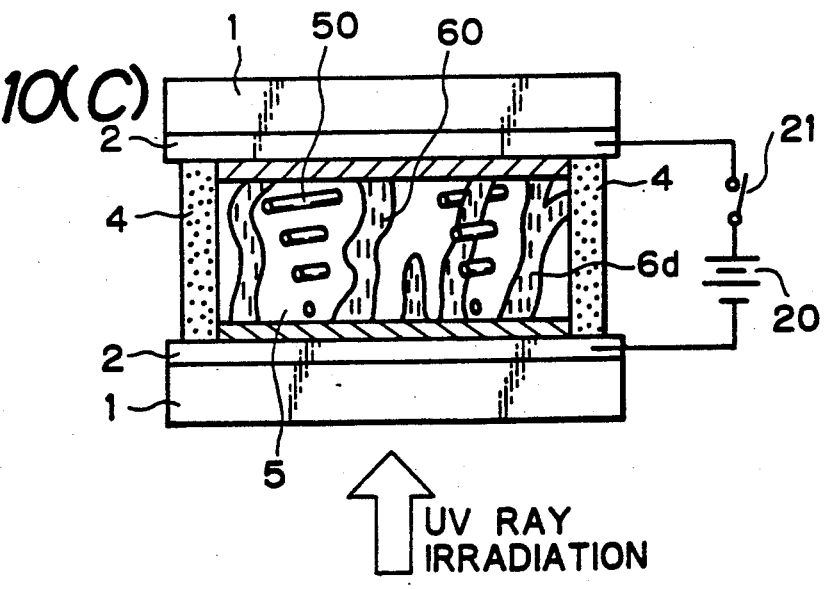

First, two glass substrates each having a size of 350×400 mm, for example, were used as the substrate 1, and after the drive electrode 2 and the alignment layer 3 were formed on each substrate, the two substrates were sealed by the seal layer 4 while interposing the spacer, not shown, to thus define an empty cell (FIG. 10(A)). Note, each alignment layer was first subjected to a rubbing treatment in a predetermined direction.

Next, the mixture 500 for forming the liquid crystal layer was charged into the space defined between the substrates, and a charging port, not shown, was sealed. The mixture 500 for forming the liquid crystal layer was prepared in the following way. First, 99.5 wt % of an ordinarily used TN type liquid crystal (e.g. a nematic liquid crystal, MJ-62877, n=1.4855, a product of Merck Company) and 0.5 wt % of a chiral agent cholesteric nanoate were mixed as the liquid crystal 5, and 3 wt % of a UV-curable resin prepolymer for forming the network-like substance 6d having the refractive index at the same level as the refractive index ($n_{ec}$, $n_{oc}$ of the liquid crystal 5 and 3 wt %, on the basis of the UV-curable resin prepolymer, of a photo-polymerisation initiator were added to the mixture. Then, the resulting mixture was sufficiently stirred at a temperature of 90° C. or more until the mixture became uniform. Then while keeping the mixture at that temperature, it was charged between the substrates (FIG. 10(B)).

While the liquid crystal cell, into which the mixture 500 for forming the liquid crystal layer was charged and sealed, was kept at 90° C., a switch 21 of a power supply 20 connected between the drive electrodes 2, such as an A.C. power supply, was closed, and a 50 V voltage, for example, was applied for 10 minutes. While this voltage was applied, the UV rays were irradiated through the transparent substrates 1 for a time such that the polymerisation of the UV-curable resin prepolymer was completed. Accordingly, the molecules 60 of the network-like substance 6d were arranged in perpendicular alignment with the substrate surfaces, by effecting the photo-polymerisation (FIG. 10(C)).

Note, when the photo-polymerisation of the mixture 500 for forming the liquid crystal layer containing the UV-curable resin prepolymer was carried out without the application of the voltage during the fabrication of the liquid crystal display panel, the molecules 60 of the network-like substance 6d took the twist arrangement. Accordingly, the reflection of light on the boundary between the liquid crystal and the network-like substance 6d could be prevented when no voltage was applied during the display, after the panel was completed, and as liquid crystal display device having a high contrast could be likewise constituted by disposing the polarization plates in parallel with each other and minimizing the leakage of light, for example.

Although all of the examples given above illustrate the principal portions of the liquid crystal cell 10, it is obvious that the liquid crystal display panel is constituted by disposing the polarization plates on both sides of the liquid crystal cell 10.

As described above, in the second embodiment of the present invention, the network-like substance is formed in the liquid crystal layer. Therefore, the orientation direction of the liquid crystal molecules is sufficiently dispersed throughout the liquid crystal as a whole, so that the orientation of the liquid crystal molecules is averaged with respect to the viewing angle direction, the maximum values on the apparent transmission factor-v-applied voltage characteristics are averaged, and the inversion of the abnormal display is eliminated. In consequence, it is possible to obtain a liquid crystal display having a higher contrast and improved observation characteristics.

EXAMPLE 3

Next, the third embodiment of the present invention, which comprises a liquid crystal cell having a cholesteric liquid crystal or a chiral nematic liquid crystal in which the starting point of the twist is randomized, charged and sealed therein, and the polarization plates, will be explained.

Figure 11:
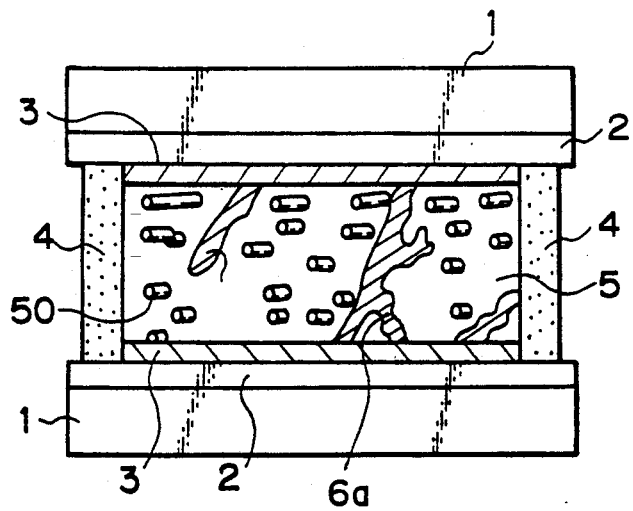
FIG. 11 is a sectional view showing an example of the third embodiment.

FIG. 11 is a schematic sectional view showing an example of the third embodiment of the present invention. In the drawing, reference numeral 4 denotes the seal layer, which is an adhesive layer incorporating therein a spacer for hermetically defining the liquid crystal charging space, and reference numeral 6a denotes the network-like substance.

Note, like reference numerals are used to identify like constituent elements as in the foregoing drawings, and an explanation of such constituent elements is omitted.

Two glass substrates each having a size of 350×400 mm were used as the substrates 1. After the drive electrode 2 and the alignment layer 3 were formed on each substrate, both substrates were sealed by the seal layer 4 while interposing the spacer, not shown, there between. At this time, the alignment layers did not need to be rubbed.

A chiral nematic liquid crystal the optical characteristics of which were optimized was used as the liquid crystal 5 to be charged into the space between both substrates, and blending for forming the network-like substance 6a in the liquid crystal was carried out.

Figure 12:
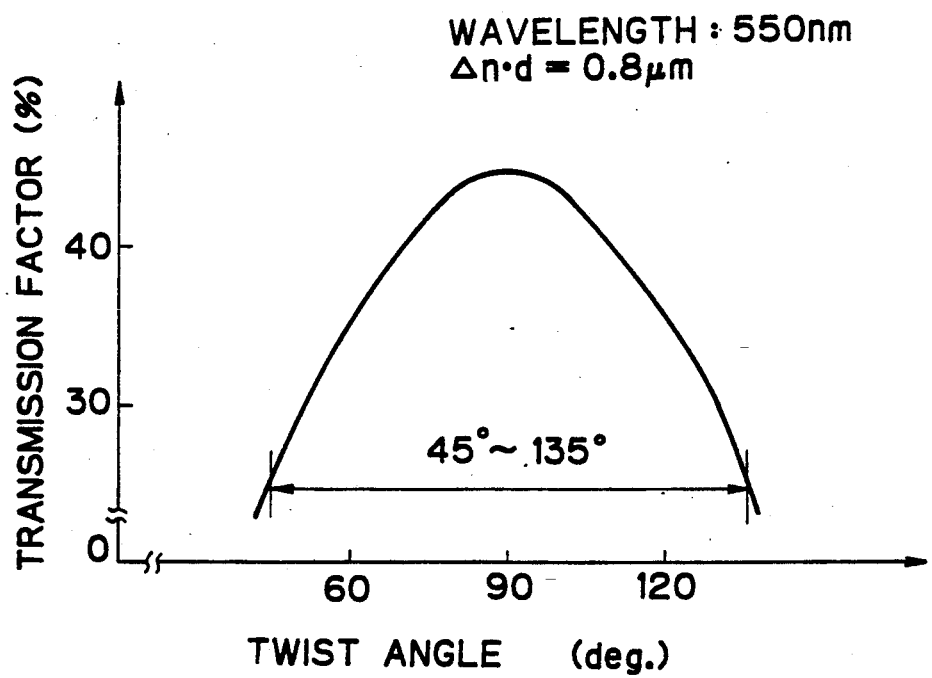
FIG. 12 is a diagram showing transmission factor-v-twist angle characteristics in an example of the third embodiment.
Figure 13:
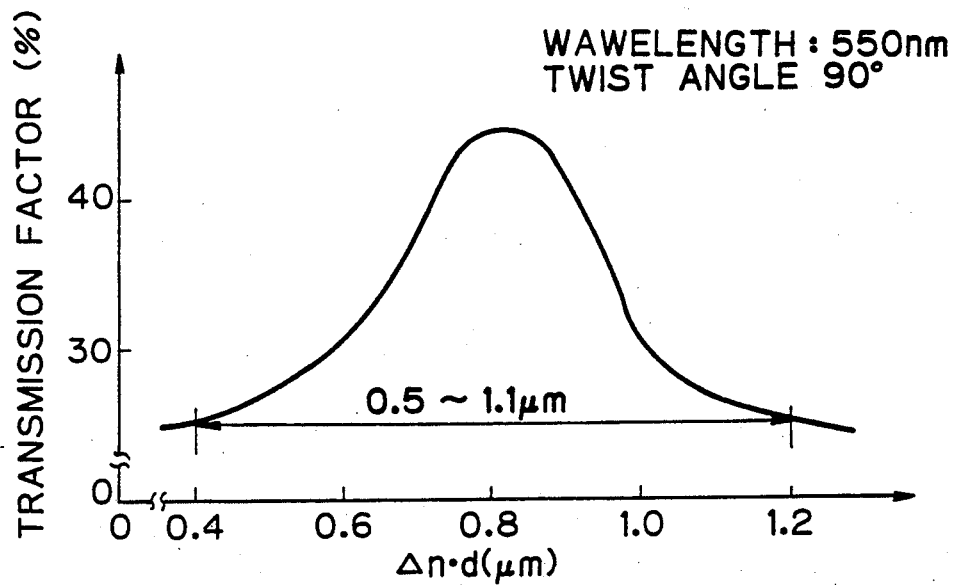
FIG. 13 is a diagram showing transmission factor-v-$\Delta n \cdot d$ characteristics in an example of the third embodiment.

FIGS. 12 and 13 show the result when the optimum value of the transmission characteristics as the optical characteristics was determined in a planar helical structure in which the helical axis of the liquid crystal was perpendicular to the transparent substrate.

Within the range of the twist angle of the liquid crystal of from 45° to 135° (substantially corresponding to 0.125-0.375 of d/p (where d: thickness of the liquid crystal layer, p: natural length of pitch)), a transmission factor greater than 25%, which was the transmission factor when the polarization state of light was completely randomized, could be obtained (see FIG. 12), and a transmission factor of at least 25% could be obtained within the range of the product $\Delta n \cdot d$ between the thickness d of the liquid crystal layer 5 and the anisotropy of its refractive index $\Delta n$ of from 0.4 to 1.2 $\mu$ (see FIG. 13).

To obtain a satisfactory transmission factor, the product $\Delta n \cdot d$ of the thickness d of the liquid crystal layer 5 and the refractive index anisotropy $\Delta n$ of the liquid crystal 5 was adjusted so as to reach 0.8 $\mu$m, and 2 wt % of an acrylic type UV-curable prepolymer and 20 wt %, based on the UV-curable prepolymer, of a photopolymerisation initiator were added to the chiral nematic liquid crystal to which a chiral agent was mixed so that the twist angle of the liquid crystal became 90°. The resulting mixture was stirred sufficiently at 90° C. or above until it became uniform. Then while the mixture was kept at the high temperature, it was charged and sealed into the space of the liquid crystal cell 10.

Next, the UV rays were irradiated until the polymerisation of the UV-curable prepolymer was completed. In this way, the network-like substance 6a was formed uniformly at a suitable density inside the liquid crystal layer 5, as shown in the drawing (see FIG. 11).

Note, the acrylic type UV-curable polymer of this embodiment had a high transparency and had little affect on the overall brightness.

Figure 14:
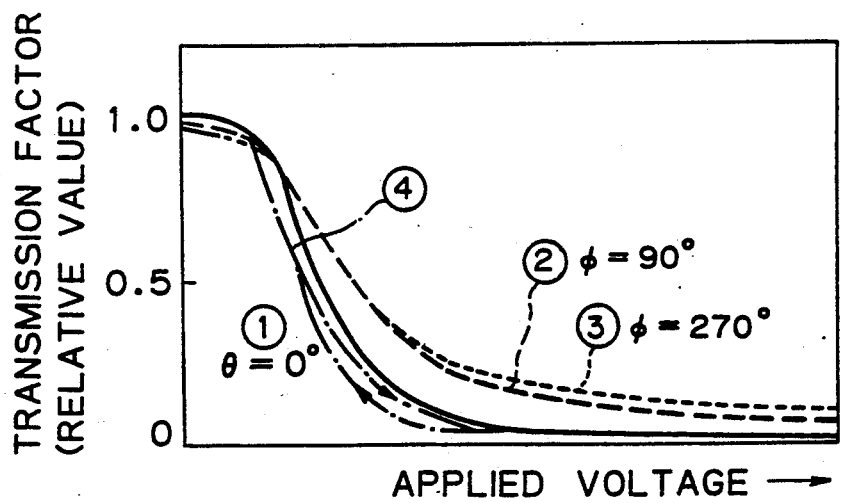
FIG. 14 is a diagram showing transmission factor-v-applied voltage characteristics in an example of the third embodiment.

FIG. 14 shows the transmission factor-v-applied voltage characteristics of this example. The transmission factor is plotted on the ordinate and the impressed voltage, on the abscissa. In the diagram, the solid line ① represents the case where $\theta = 0°$, i.e., when the liquid crystal display device is viewed from immediately above, the dash line ② represents the case where $\phi = 90°$, i.e., when the liquid crystal display panel is viewed from the deep side, and the dotted line ③ represents the case where $\phi = 270°$ C., i.e., when the display panel was viewed from the front side. The dot-chain line ④ represents the hysteresis when the network-like substance does not exist.

As can be seen from the diagram, the maximum value did not appear on any curves, although the contrast differed depending on the viewing angle direction. Accordingly, the inversion of the display did not occur and the display performance was greatly improved. The hysteresis disappeared due to the network-like substance, and a display free from image sticking was obtained.

Figure 15:
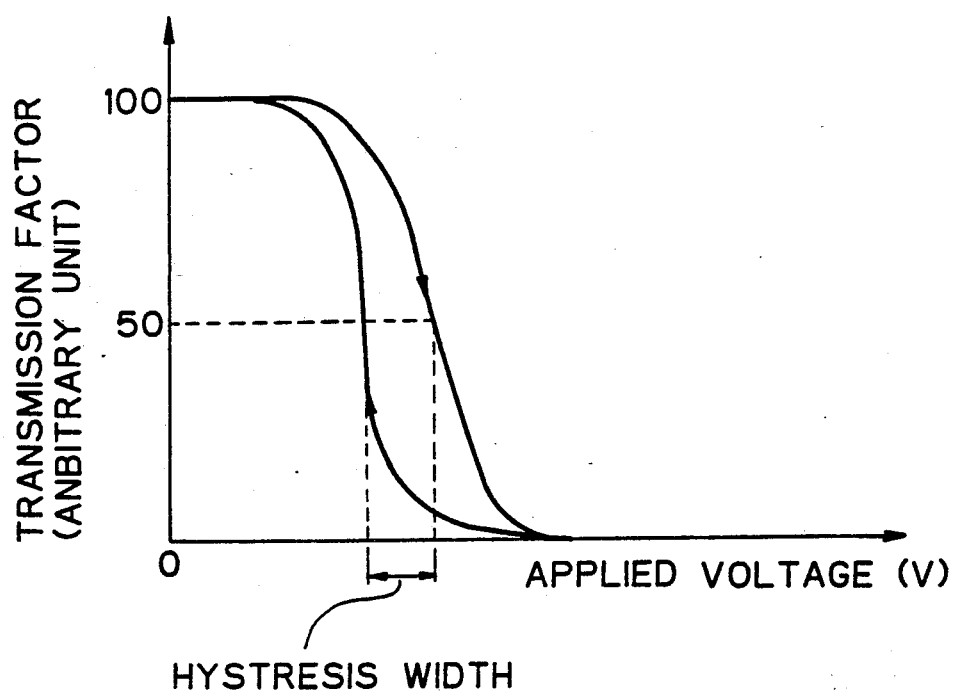
FIG. 15 is a graph for defining a hysteresis width.

Regarding the hysteresis, the definition of the hysteresis width is shown in FIG. 15. As shown in FIG. 15, the difference between the voltages at which the transmission factor remains 50% is defined as the hysteresis width.

Figure 16:
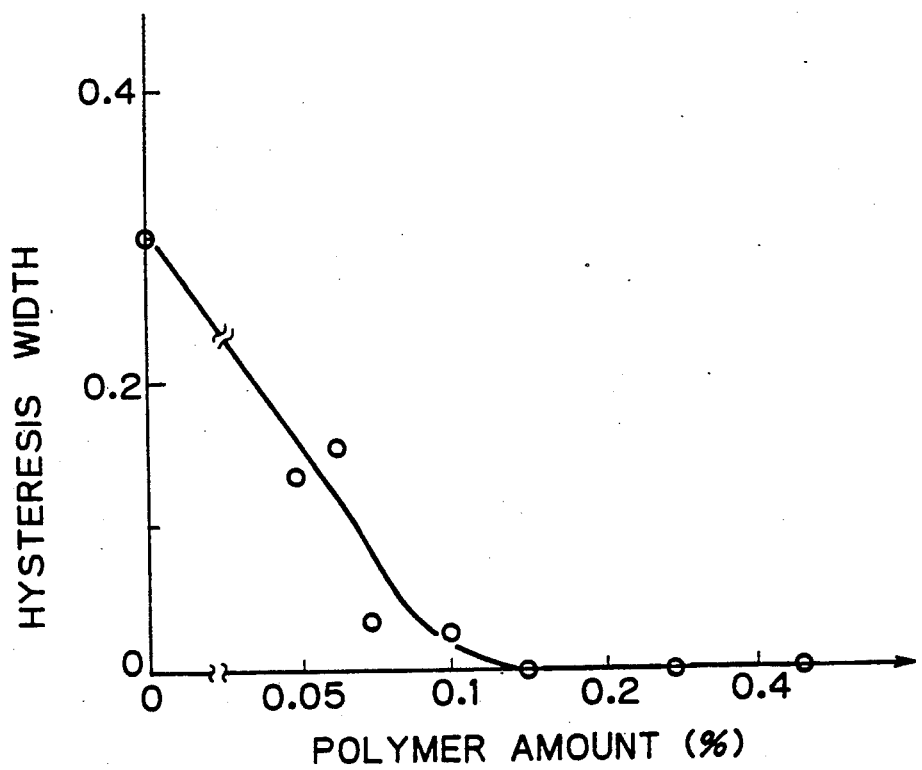
FIG. 16 is a diagram showing the relationship between a polymer amount and the hysteresis width in the third embodiment.

FIG. 16 shows the relationship between this hysteresis width and the polymer amount in the third embodiment of the present invention. As can be clearly understood from FIG. 16, the hysteresis disappears when the polymer amount is at least about 0.1 wt %. Thus, it can be appreciated that the polymer amount in the liquid crystal layer is preferably at least 0.1 wt %.

Figure 17:
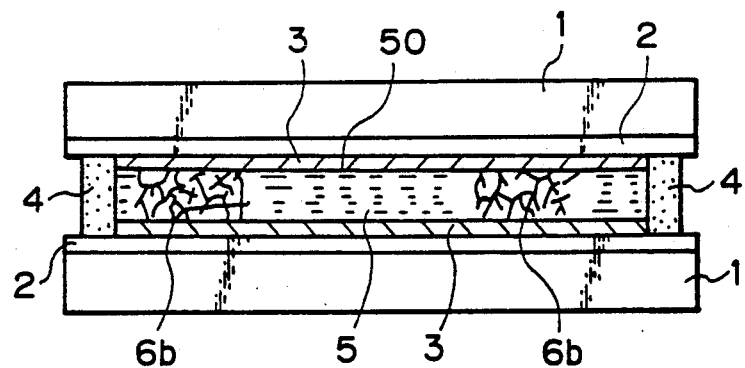
FIG. 17 is a sectional view showing another example of the third embodiment.

FIG. 17 shows another example wherein reference numeral 6b denotes the network-like substance. This example is characterized in that the network-like substances 6b are formed discontinuously inside the liquid crystal layer 5 with small gaps therebetween.

Such network-like substances were formed by effecting the UV irradiation at discontinuous intervals, in comparison with the full surface UV irradiation in the foregoing example, or by first coating the polymerisation initiator on the substrates with discontinuous small gaps, charging the liquid crystal 5 (chiral nematic liquid crystal) containing a UV-curable prepolymer (NOA65, a product of Norland Corp.), and then irradiating the UV rays. This example had the advantage that the influence on the brightness of the liquid crystal display panel could be further reduced by increasing the transmission factor on average.

Furthermore, in this case, if the liquid crystal region in which the network-like substance was not formed was arranged to be linear, the shape of the domain wall (the wall surface on which the orientation of the liquid crystal was discontinuous) occurring at the center of that crystal region also became linear and was stable over an elapse of time, and thus the response time was improved.

Figure 18:
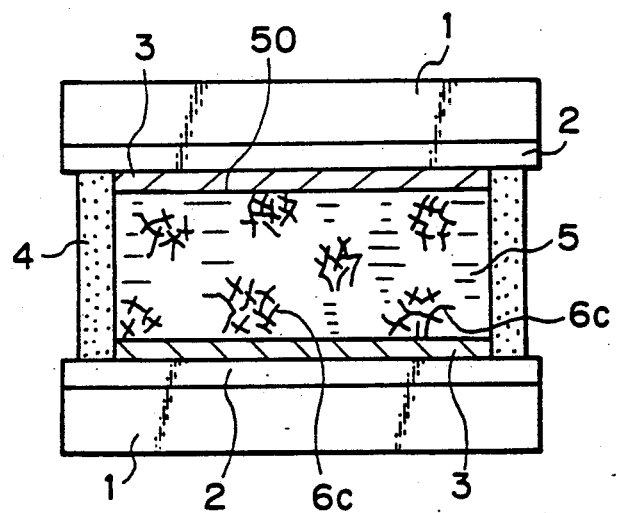
FIG. 18 is a sectional view showing still another example of the third embodiment.

FIG. 18 shows still another example. In the drawing, reference numeral 6c denotes the network-like substance. This example is characterized in that the network-like substance 6c is formed as a plurality of small masses dispersed in the liquid crystal layer 5.

The network-like structure was formed by the method which converted the polymerisation initiator into the fine particles not soluble in the liquid crystal 5, dispersed same, and then carried out the polymerisation. This example, too, had the advantages that a display free from the image sticking was obtained and the display device could be produced easily, in the same way as in the foregoing examples.

Figure 19:
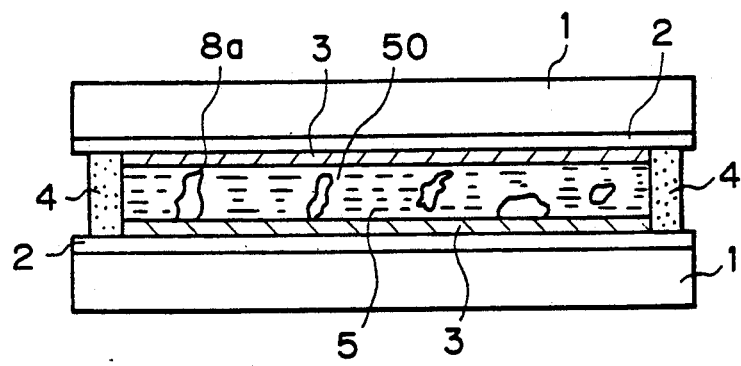
FIG. 19 is a sectional view showing still another example of the third embodiment.

FIG. 19 shows still another example. In the drawing, reference numeral 8a denotes the small masses of the polymer. This example is characterized in that the small masses 8a of the polymer is dispersed in the liquid crystal layer 5. The small masses were formed, for example, by charging the mixture 50 for forming the liquid crystal layer into the space of the liquid crystal cell 10, then lowering the temperature of the liquid crystal cell 10 to coagulate the UV-curable prepolymer, and irradiating the UV rays before the coagulated prepolymer adhered to the substrate.

This example also obtained a display free from the image sticking, in the same way as in the foregoing examples. Since the polymer was a granular masses, it had little influence on the orientation of the liquid crystal. Accordingly, an advantage was obtained in that the influence on the brightness of the liquid crystal display panel was reduced.

Figure 20:
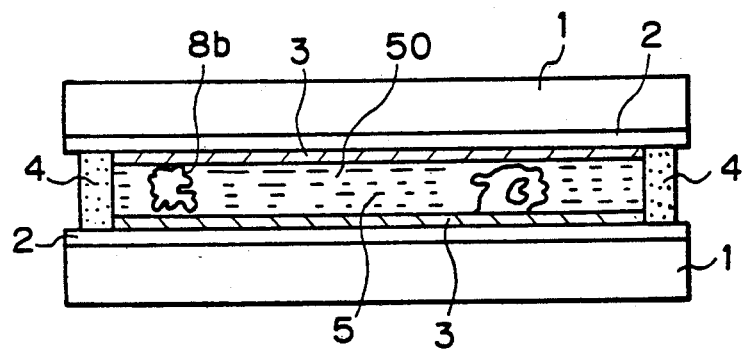
FIG. 20 is a sectional view showing still another example of the third embodiment.

FIG. 20 shows still another example. In the drawing, reference numeral 8b denotes small granular masses of the polymer. This example is characterized in that the small granular masses of the polymer 8b are dispersedly formed in the liquid crystal layer 5.

This liquid crystal layer 5 was formed by scattering the small granular masses of the polymer, which was coagulated by a tackifier, on the alignment layer 3, and charging the liquid crystal 5 into the space of the liquid crystal cell 10. This example provided the advantages that a display free from the image sticking was obtained and the production became easier in some cases, in the same way as the foregoing examples.

Figure 21:
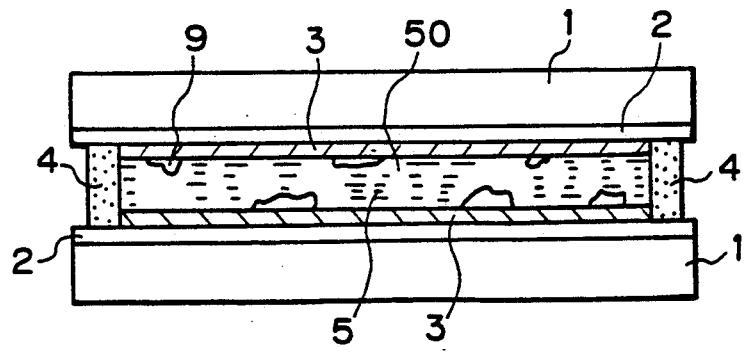
FIG. 21 is a sectional view showing still another example of the third embodiment.

FIG. 21 shows still another example. In the drawing, reference numeral 9 denotes protrusions of the polymer. This example is characterized in that the protrusions 9 of the polymer are dispersedly formed on the alignment layer 3.

The display device of this example was produced, for example, by charging the mixture 50 for forming the liquid crystal layer into the space of the liquid crystal cell 10, lowering the temperature of the panel to coagulate the UV-curable prepolymer, and to allow it to adhere to the alignment layer 3, and then irradiating the UV rays.

This example provided advantages such that a display free from the image sticking was obtained in the same way as in the foregoing examples, and since the polymer protruded, the influence on the brightness of the liquid crystal display panel was reduced. Note, it is also possible to form the protrusions by forming a film, which will the form the protrusions, on the alignment layer 3, and etching same, or carrying out a vacuum deposition using a mask. Note, the examples shown in FIGS. 18, 19 and 21 used the same prepolymer and the same liquid crystal.

As described above, the third embodiment of the present invention can sufficiently disperse the orientation directions of the liquid crystal molecules 50 throughout the liquid crystal layer as a whole by using the cholesteric liquid crystal or chiral nematic liquid crystal having a randomized starting point of the twist, as the liquid crystal of the liquid crystal cell.

Namely, since the orientation of the liquid crystal molecules can be averaged in the viewing angle direction, the maximum values on the apparent transmission factor-v-applied voltage characteristics are averaged and the abnormal inversion of the display is eliminated. Therefore, the present invention makes a great contribution to an improvement in the performance and quality of the liquid crystal display device.

Furthermore, since the network-like substance is formed inside the liquid crystal layer, the hysteresis appearing on the transmission factor-v-applied voltage characteristics can be eliminated.

We claim:

1. A liquid crystal display device equipped with a liquid crystal cell formed by disposing a pair of transparent substrates, each having a drive electrode and an alignment layer formed and laminated thereon, in such a manner as to oppose each other with a small space therebetween and by charging and sealing a liquid crystal into said space, characterized in that the molecules of the liquid crystal are orientated along a vertical axis of a substrate surface under a twist state or a homeotropic and homogeneous state to the substrate surface, and the orientation of the liquid crystal molecules inside a plane parallel to the substrate surface and spaced apart by an arbitrary distance from said substrates is irregular inside said plane wherein a material for disturbing the orientation of the liquid crystal molecules is added.

2. A liquid crystal display device according to claim 1, wherein a rubbing treatment is applied to said alignment layer.

3. A liquid crystal display device according to claim 1, wherein said material for disturbing the orientation of the liquid crystal is a network-like substance.

4. A liquid crystal display device according to claim 3, wherein said network-like substances are discontinuously formed inside said liquid crystal layer with small gaps therebetween.

5. A liquid crystal display device according to claim 3, wherein said network-like substances are formed as a plurality of small masses dispersed in said liquid crystal layer.

6. A liquid crystal display device according to claim 3, wherein said network-like substance consists of an organic polymer.

7. A liquid crystal display device according to claim 1, wherein said network-like substance is a photopolymerisable polymer.

8. A liquid crystal display device according to claim 3, wherein the difference between the refractive index ($n_{ep}$, $n_{op}$) of said network-like substance and the refractive index ($n_{ec}$, $n_{oc}$) of the liquid crystal is within ±0.1.

9. A liquid crystal display device according to claim 1, wherein the molecular orientation of said network-like substance is formed so as to correspond to the molecular orientation of the liquid crystal.

10. A liquid crystal display device according to claim 3, wherein the molecular orientation of said network-like substance is formed so as to correspond to the molecular orientation of the liquid crystal, and is formed while a voltage is applied between said drive electrodes during the production thereof.

11. A liquid crystal display device according to claim 1, wherein said liquid crystal cell is formed by charging and sealing a cholesteric liquid crystal or a chiral nematic liquid crystal, and the orientations of the liquid crystal molecules at the starting point of the twist of said liquid crystal are randomized.

12. A liquid crystal display device according to claim 1, wherein said liquid crystal cell is formed by charging and sealing a cholesteric liquid crystal or a chiral nematic liquid crystal, the orientations of the liquid crystal molecules at the starting point of the twist of said liquid crystal are randomized, said liquid crystal has a planar helical structure in which the helical axis thereof is vertical to said transparent substrates, the product $\Delta n \cdot d$ of the thickness d of the liquid crystal layer and the refractive index anisotropy $\Delta n$ of said liquid crystal is within the range of 0.4 to 1.2 $\mu$m, and the twist angle of said liquid crystal is within the range of 45° to 135°.

13. A liquid crystal display device according to claim 1, wherein said liquid crystal cell is formed by charging and sealing a cholesteric liquid crystal or a chiral nematic liquid crystal, the orientations of the liquid crystal molecules at the starting point of the twist of said liquid crystal are randomized, and network-like substances or small granular masses are formed in the liquid crystal layer.

14. A liquid crystal display device according to claim 1, wherein said liquid crystal cell is formed by charging and sealing a cholesteric liquid crystal or a chiral nematic liquid crystal, the orientations of the liquid crystal molecules at the starting point of the twist of said liquid crystal are randomized, and protrusions are formed on said alignment layers formed on said drive electrodes.

15. A liquid crystal display device according to claim 1, wherein the material for disturbing the twist of the orientation of the liquid crystal molecules is added in an amount of 0.1 to 20 wt % to said liquid crystal cell.

16. A liquid crystal display device according to claim 1, wherein said arbitrary distance from said substrate is from the interface of said substrate to the center of said substrate in the direction of depth of said liquid crystal display panel.

* * * * *

UNITED STATES PATENT AND TRADEMARK OFFICE
CERTIFICATE OF CORRECTION

PATENT NO. : 5,189,540
DATED : February 23, 1993
INVENTOR(S) : Kimiaki NAKAMURA et al.

It is certified that error appears in the above-indentified patent and that said Letters Patent is hereby corrected as shown below:

Col. 3, line 40, change "product" to --production--.

Signed and Sealed this

Thirty-first Day of May, 1994

Attest:

BRUCE LEHMAN

Attesting Officer     Commissioner of Patents and Trademarks